United States Patent [19]

Holmes

[11] Patent Number: 4,613,921
[45] Date of Patent: Sep. 23, 1986

[54] DISK MEMORY APPARATUS

[76] Inventor: William A. Holmes, 7 Bradlee Rd., Marblehead, Mass. 01945

[21] Appl. No.: 444,610

[22] Filed: Nov. 26, 1982

[51] Int. Cl.⁴ .................. G11B 25/04; G11B 5/016
[52] U.S. Cl. ................................. 360/133; 360/97
[58] Field of Search .................... 360/97–99, 360/133, 86, 135; 346/137; 369/261, 270–271; 206/444

[56] References Cited

U.S. PATENT DOCUMENTS 4,060,839 11/1977 Meadows .......................... 346/137
4,149,207 4/1979 Porter, Jr. et al. ................. 360/133
4,185,314 1/1980 Hatchett et al. ................... 360/133
4,352,132 9/1982 Gyi ....................................... 360/133
4,445,157 4/1984 Takahashi ........................... 360/97
4,535,434 8/1985 Kishi ................................. 360/133 X

FOREIGN PATENT DOCUMENTS 0076064 9/1982 European Pat. Off. .
2507371 6/1982 France .
2101390 1/1983 United Kingdom ............. 360/133

Primary Examiner—John H. Wolff
Assistant Examiner—David J. Severin
Attorney, Agent, or Firm—Lahive & Cockfield

[57] ABSTRACT

A magnetic disk memory seats a memory disk with a consistent high accuracy by engagement on only one side of the disk with a drive chuck that imparts both a circumferential disk-rotating force and a radial disk-locating force. The two forces firmly seat an angled pair of precision disk faces onto the drive spindle.

The memory disk further can attach at only an inner periphery to the disk hub, by means of a selectively compliant adhesive tape, to allow the disk to deflect elastically away from the hub for accurate head penetration at inner recording tracks.

6 Claims, 11 Drawing Figures

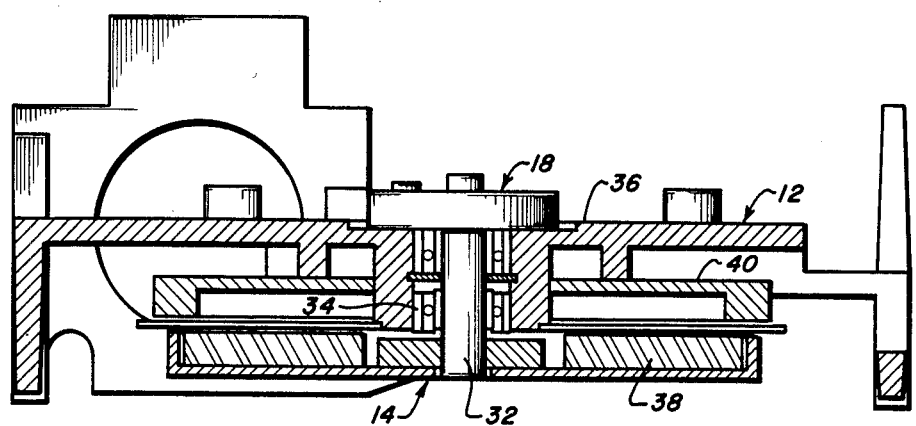
FIG. 3
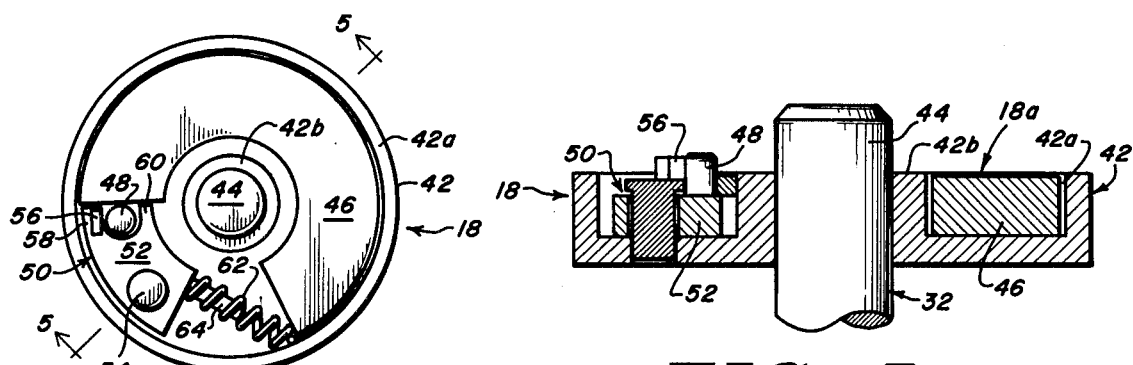
FIG. 4
FIG. 5
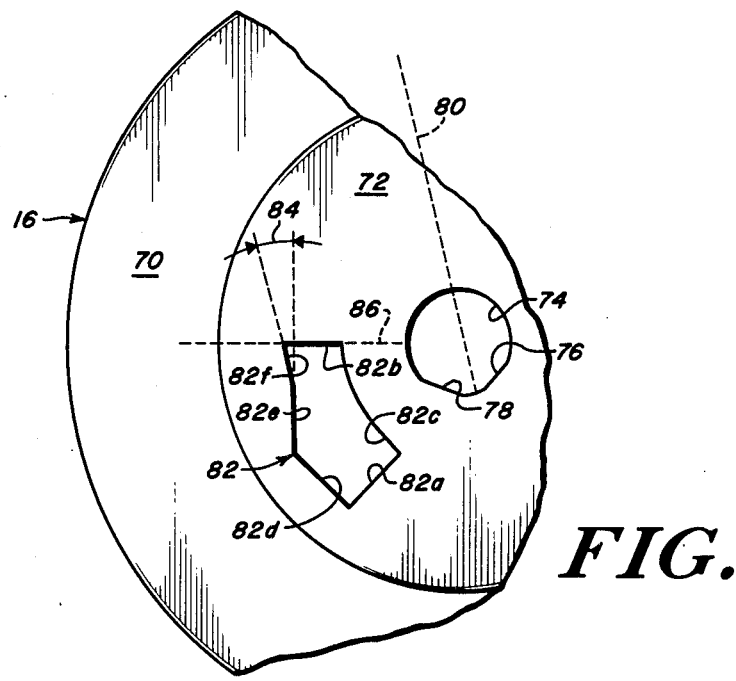
FIG. 6

DISK MEMORY APPARATUS

BACKGROUND

This invention provides a disk memory that seats a memory disk with a consistent high accuracy by a drive chuck that engages only one side of the disk. Features of the invention reside in the driven hub of the disk and in the drive chuck.

The invention also provides a unique attachment of the storage medium of the disk to the disk hub. The attachment eases the elastic deflection of the disk, as conventionally occurs upon read-write engagement with the transducer head.

Conventional disk drives, particularly for flexible magnetic media often termed "floppy disks", engage the center of the disk from opposite sides to position the disk and to rotate it. Consistent accurate positioning of each disk is required to attain proper read/write interaction with the transducer head and to attain correct track location and density.

Floppy disks traditionally are relatively large, with a diameter of either five inches or eight inches. There is now a need for equally high performance disk memories with significantly smaller disks, particularly with a diameter under four inches. Conventional practices for mounting, locating and driving the magnetic medium of a floppy disk are not readily applied to such smaller disk memories.

It accordingly is an object of this invention to provide disk memory apparatus that locates a memory disk with consistent high accuracy by engaging only one side of a memory disk.

A further object of the invention is to provide apparatus which attains such location of a disk in both the radial, i.e. lateral, and the vertical directions.

Another object of the invention is to provide disk-locating memory apparatus of the above character which attains repeatable indexing of different disks, as desired to use the full track capacity of the recording medium.

It is also an object of the invention to provide disk memory apparatus of the above character which is highly reliable and low in cost, and further which is well suited for use with memory disks of small size.

It is a further object of this invention to provide a magnetic memory disk in which the recording medium is relatively free to deflect from the disk hub, as desired for transducer head penetration at recording tracks close to the disk center.

Other objects of the invention will in part be obvious and will in part appear hereinafter.

CROSS REFERENCE TO OTHER APPLICATIONS

This application incorporates by this reference the disclosure in the commonly assigned and copending applications for patent Ser. Nos. 444,612 and 444,611 entitled "Disk Drive" and "Anti-Backlash Nut and Head Positioner", respectively, filed on even date herewith and both now abandoned.

SUMMARY OF THE INVENTION

A disk memory according to the invention operates with a recording disk having a central hub with a central aperture for receiving a spindle of the disk drive. The spindle-receiving hub aperture is defined in part by a pair of precisely-located flat surfaces which define between them an included angle of less than 180°. The flat surfaces thus define between them a vee-shaped saddle. The bisector of the included angle between the flat surfaces has a selected orientation on the disk hub.

The annular surface of the disk hub radially outward of the spindle-receiving aperture has a recess therein which receives further elements of the disk drive for accurately locating the disk relative to the drive elements, as well as for spinning the disk. The recess in the disk hub extends circumferentially, from a first end thereof in the direction of disk rotation to a second end that is selectively located relative to the flat surfaces of the spindle-receiving hub aperture. This second end of the hub recess includes a rotational driving surface that extends substantially radial on the hub. The radially inner side of the recess extends between the first and second circumferentially spaced ends of the recess at not greater than a first radial distance from the spindle-receiving aperture. The outer radial side of the recess is formed with at least three circumferentially successive sections. The first such section, commencing at the first circumferential end of the recess, is spaced from the spindle-receiving aperture at not less than a second radial distance which exceeds the first radial distance. The second such surface section is a radial camming surface aligned at a progressively radially decreasing distance from the aperture between the second distance and a lesser third distance which is still greater than the aforementioned first distance. The third section of this surface, which typically extends to the second end of the recess, is spaced from the spindle-receiving aperture by a distance close to the aforementioned third distance, particularly relative to the second distance, but preferably not less than the third distance.

The second circumferential end of the recess is located relative to the angle bisector such that a rotational drive force applied to the second circumferential end of the recess, and a radially outward positioning force applied to the third section of the outer side of the recess, produce a resultant force that is oriented longitudinally and preferably parallel to that bisector. Further, the resultant force is directed away from the apex of the bisected angle.

With this arrangement, the noted resultant force moves the memory disk relative to the disk drive to maintain both flat surfaces in the disk aperture seated against the drive spindle. That is, the structure of the disk hub is such that the disk hub receives from the disk drive a resultant force that not only spins the disk, but presses the vee-saddle of the hub aperture firmly against the drive spindle, thereby reliably locating the disk radially relative to the driving spindle.

A further feature is that the third, i.e. forwardmost, section of the outer surface of the recess in the disk hub preferably is slightly angled in the direction of increasing radial distance. Hence movement along this surface section in the direction of hub rotation is to slightly greater radial distances from the center of the hub. With this geometry, a radially-outward force exerted on this surface section has a component directed opposite to the direction of disk rotation. This is desired to attain consistent proper indexing of disks by consistently maintaining the disk-rotating drive element firmly seated against the rotational driving surface of the disk hub.

A disk memory according to the invention further has a drive chuck for the accurate positioning and rotational drive of a disk having a hub structured as stated above. The drive chuck includes a precision located spindle of circular cross section and relative to which the disk is to be positioned. The drive chuck preferably retains the disk hub firmly seated thereto by means of a permanent magnet structure in the drive chuck and a magnetically soft material in the disk hub. The drive chuck has a driven member radially spaced from the spindle for projecting into a recess of the disk hub and imparting a circumferentially-directed rotational driving force thereto. The drive chuck further includes a radially-biasing member that imparts a selected radial force to the hub. For use with the foregoing disk hub, the drive member is spaced from the drive spindle at between the stated first and third radial distances. The bias member is normally within the stated second radial distance and is movable radially inward to be within the stated third distance.

This bias member preferably projects into a recess in the hub and engages the outer side of the recess. This engagement exerts on the disk hub a radially-outward force which is independent of the circumferentially-directed rotational drive force which the drive member imparts to the hub. The bias member preferably is movable radially with a resilient radially-outward bias. The bias member accordingly can engage a camming surface section of the hub recess and slide along that surface to progressively cam the disk toward the desired location.

In the illustrated preferred embodiment, after traversing the full length of this camming surface, due to the rotational movement of the drive chuck relative to a disk, the bias member progresses to engage further surface section of the hub where it continues to apply the radially-directed locating force. The bias member is, however, essentially free to slide along this further surface section until the drive member mounted with it on the drive chuck engages a circumferential end of the hub recess and thereupon commences rotating, i.e. spinning, the disk in tight direct coupling with the drive chuck. The engagement of the bias member with the further surface section of the hub recess preferably is arranged to maintain the chuck drive member in contiguous driving abutment with the hub recess, as desired.

A further feature of the invention is that a selectively compliant web is adhered to the recording medium of the disk and to the disk hub for securely joining them together. This attachment is effective essentially at the inner edge of the recording medium, and the disk hub extends radially out beyond that edge for positionally supporting a radially larger annular portion of the medium. The recording medium hence is free to deflect elastically from this underlying portion of the disk hub, to which the recording medium is not attached. A magnetic recording head, i.e. a read/write transducer, bears against a flexible recording medium sufficiently to produce such an elastic deflection, which commonly is termed "head penetration". Hence this relatively unrestricted elastic deflection of the recording medium adjacent the location of inner recording tracks is desired to enhance the utility and the locational precision of recording tracks close to the center of the disks.

The invention accordingly comprises the several steps and the relation of one or more of such steps with respect to each of the others, and the apparatus embodying features of construction, combinations of elements and arrangement of parts exemplified in the following detailed disclosure and which effects such steps, and the scope of the invention is indicated in the claims.

BRIEF DESCRIPTION OF DRAWINGS

For a fuller understanding of the nature and objects of the invention, reference should be made to the following detailed description and the accompanying drawings, in which:

FIG. 3 is a simplified transverse sectional view of the disk drive of FIG. 1, along section line 3—3 thereof;

FIG. 4 is a top plan view of the drive chuck of the disk drive of FIG. 1;

FIG. 5 is a transverse cross section of the drive chuck of FIG. 4 taken along line 5—5 thereof;

FIG. 6 is a fragmentary plan view of a memory disk according to the invention;

DESCRIPTION OF ILLUSTRATED EMBODIMENTS

Figure 1:
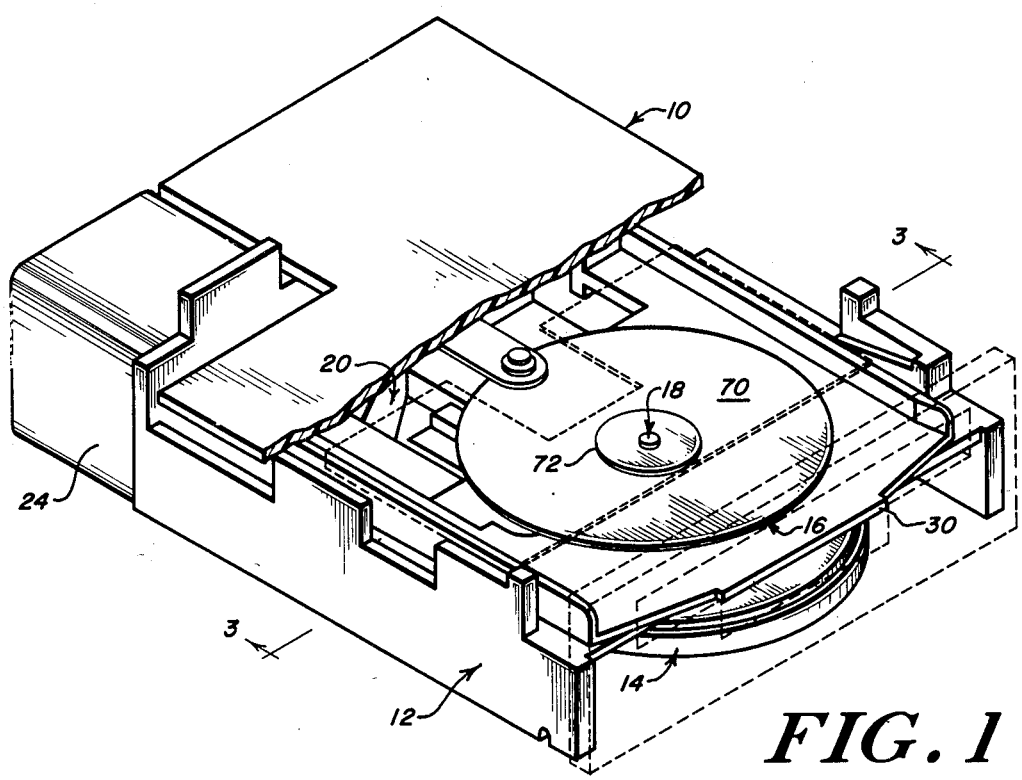
FIG. 1 shows a disk memory embodying features of the invention.
Figure 2:
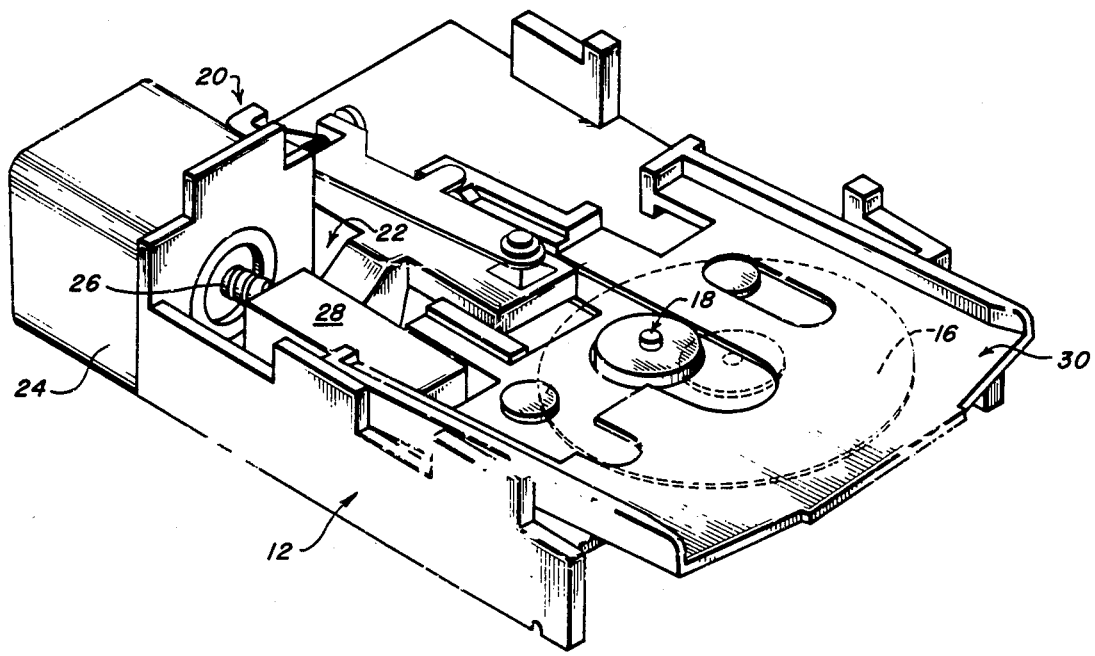
FIG. 2 shows the disk memory of FIG. 1 with the circuit board removed, with the memory disk removed, and with the receiver in the unseated position ready for loading a memory disk into the disk memory.

A disk memory 10 according to the invention has, as FIGS. 1 and 2 show, a chassis 12 which mounts a motor 14. The motor has a spindled chuck 18 on which a memory disk 16 seats and which imparts both locating and driving forces to the disk. The chassis 12 also mounts a transducer unit indicated generally at 20 which includes a head-carrying carriage 22 which a positioning drive 24 selectively positions by means of a lead screw 26 and follower nut 28. A receiver 30 is movable on the chassis between a seated position shown in FIG. 1 and an unseated position shown in FIG. 2. The receiver when seated carries a memory disk 16 to be positioned and driven by way of the motor chuck 18 and to be engaged for read/write information transferring operation by the carriage-carried recording head. In the unseated position of the receiver 30, the carriage 22 releases its engagement with a disk and the memory disk thereon is lifted free of the spindled motor chuck 18.

FIG. 3 shows that the illustrated spindled chuck 18 is carried on a motor shaft 32 assembled directly with the chassis 12 by way of bearings 34, 34. The spindled chuck 18 is at one end of the motor shaft 32, above the chassis platform 36. At the other, lower end of the motor shaft is a flange-mounted rotor 38. The illustrated motor stator 40 also is separately mounted directly to the chassis 12, as shown.

The spindled chuck 18, shown in FIGS. 4 and 5, has a casing 42 secured on the motor shaft 32 adjacent the shaft upper end. The shaft extends beyond the casing to form a spindle 44 of circular cross section. The illustrated casing 42 is essentially a circular wheel with inner and outer annular rims 42a and 42b, the edges of which form a planar chuck face 18a on which the hub of a storage disk seats, as appears in FIG. 1. The annular channel which the casing 42 defines between the rims 42a and 42b mountingly seats a permanent magnet 46, a disk rotating drive pin 48, and a positioning mechanism 50. The upper surface of the illustrated permanent magnet is substantially coplanar with the casing rims.

The drive pin 48 is fixed to the casing 42, illustratively between the inner and outer rims thereof, and projects a cylindrical stem outward beyond the planar chuck face 18a by at least several thousandths of an inch in order to seat in a recess in the hub of a disk seated on the chuck.

The illustrated disk positioning mechanism 50, which operates with a motor 14 (FIGS. 1 and 3) which applies clockwise drive (FIG. 4) to the chuck 18, has a resiliently-acting radially biasing cam 52 pivotally seated on a post 54. The post is fixed to the casing at the floor of the channel and extends parallel to the drive pin 48, which is parallel to the spindle 44 and hence to the motor shaft 32.

The illustrated cam 52, which seats fully within the casing channel except for a projecting tab 56, has a bifurcated forward end formed with arms 58 and 60 that fit on either side of the drive pin 48. The tab 56 extends from the arm 58 transverse to the chuck face 18a, from which it projects to engage the hub of a disk. The cam has a first moment arm, as viewed in FIG. 4, between the tab 56 and the axis of rotation on the post 54. A second moment arm extends transversely to the first between the axis of rotation on post 54 and the force which a compression spring 62 imposes on the cam. The spring is seated on a locating pin 64 projecting rearwardly from the body of the cam 52 and is compressed between the rotationally back end of the cam 52 and a spring seat formed by one edge of the magnet 46 and the inner wall of the casing outer rim 42a, as shown in FIG. 4. The compressed spring 62 urges the cam 52 to rotate in a counter-clockwise direction about the post 54. This rotation, however, is limited in at least one instance by the abutment of the cam arm 60 with the drive pin 48, as appears in FIG. 4. In this illustrated position of the mechanism 50, the arm 60 is spaced radially outward of the inner rim 42a. The cam accordingly is free to rotate clockwise from the position shown in FIG. 4, against the bias of the spring 62. Such clockwise rotation of the cam stops when the cam arm 58 abuts the drive pin 48.

The memory disk 16 for operation with the spindled chuck 18 has, as FIG. 6 shows, a relatively thin disk-like annulus 70 of stiffly-flexing magnetic recording material which can be similar to those conventional used in magnetic floppy disks, and a hub 72. The illustrated disk 16 is of unusually small size wherein the recording annulus 70 has a circular outer circumference of three and one-quarter inch diameter and it has a central opening, illustratively circular, with a diameter in the order of one-half inch.

The illustrated preferred hub 72 is a flat disk of magnetically soft material such as ferretic stainless steel for magnetic attraction to the permanent magnet 46 of the drive chuck 18 (FIGS. 4 and 5). The hub is centrally apertured with a spindle seating aperture 74 of circular cross section except for two flat surfaces 76 and 78. The two flat surfaces are angled relative to one another to form an included angle between them of less than 180°, thereby to form between them a precisely located vee-shaped saddle. The bisector 80 of the included angle between the flat surfaces 76 and 78 has a selected orientation on the disk hub, as described below. The diameter of the circular portion of the disk aperture 74 can be significantly larger than the diameter of the chuck spindle on which it seats, thereby facilitating placement of the disk 16 onto the spindled chuck as appears in FIG. 1.

With further reference to FIG. 6, the disk hub 72 has a positioning and driving recess indicated generally at 82. The illustrated recess extends fully through the disk for convenience of manufacture. The illustrated recess has an arcuate length, i.e. extends circumferentially, along the direction in which the disk is rotationally driven from a load end 82a to a drive end 82b. The side of the recess forming the load end 82a is illustrated as a straight line extending parallel to a radius which passes through the recess. The side of the recess which forms the drive end 82b includes a flat surface aligned along a radius 86, as shown. The radially inner side 82c of the recess is spaced by at least a first radial distance from the center of the hub and preferably is an arc of constant radius.

The remaining side of the illustrated recess 82, i.e. the radially outer side, has three circumferentially contiguous sections 82d, 82e and 82f. The surface section 82d, extending from the load end 82a, can be straight as shown, or arcuate, and is located at a radius in excess of a selected second value. The surface section 82e provides a radially inward camming action. For this purpose, it preferably is straight as illustrated and extends radially inward from the second radial value at the juncture with the surface section 82d to a third radial value less than the second value but greater than the first value, as illustrated. The foregoing dimensions of the recess 82 are selected such that the drive pin 48 and bias tab 56 of the spindled chuck 18, FIGS. 4 and 5, fit freely within the recess at the load end 82a, and that the tab 56 engages the surface section 82e with a camming engagement. Further, the drive pin and the bias tab, when the cam 52 of the chuck 18 is rotated clockwise from the position of FIG. 4, fit within the relatively narrow drive end 82b of the recess.

As further shown in FIG. 6, the third, outer surface section 82f of the recess 82 extends from the camming surface section 82e to the drive end 82b of the recess. This surface section can, as illustrated, be flat and oriented to be essentially at the third radial distance from the center of the hub. More particularly, this surface section preferably is at a radial location not less than the third value and instead extends slightly radially outward, e.g. is angled outward relative to the surface section 82e as designated with the angle 84.

By way of illustrative example and without limitation, one hub 72 according to the invention for a three and one-quarter inch diameter floppy magnetic recording disk has a hub outer diameter of 0.95 inch, operates with a chuck spindle 44 of 0.197 inch diameter, has an aperture 74 having a diameter of 0.21 inch in the circular portion, and has two flat surfaces 76 and 78 defining an included angle of 90° between them. The bisector 80 of this angle is oriented at 75° ahead, i.e. in the direction of clockwise rotation of the disk hub illustrated in FIG. 6, of the radial line 86. The recess 82 extends circumferentially for slightly more than 45° behind this radial line, i.e. counterclockwise from it, has the inner side 82c at a radial distance of 0.22 inch (the first radial distance) the camming surface 82e extends from a radial distance of 0.375 inch (the second radial distance) to 0.322 inch (the third radial distance), and the angle 84 has a value of approximately 10°.

Figure 7A:
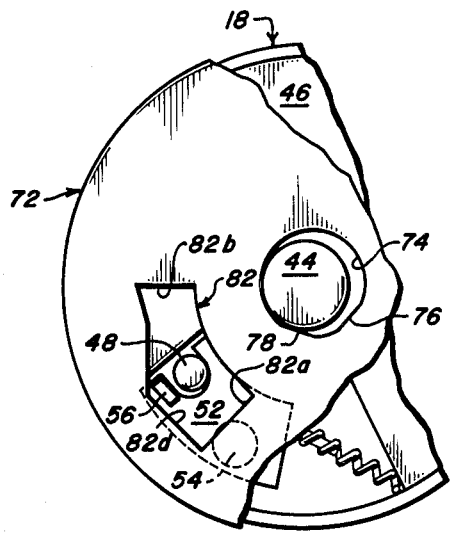
FIGS. 7A, 7B and 7C show different sequences in the positioning of a memory disk onto a drive chuck in accordance with features of the invention.
Figure 7B:
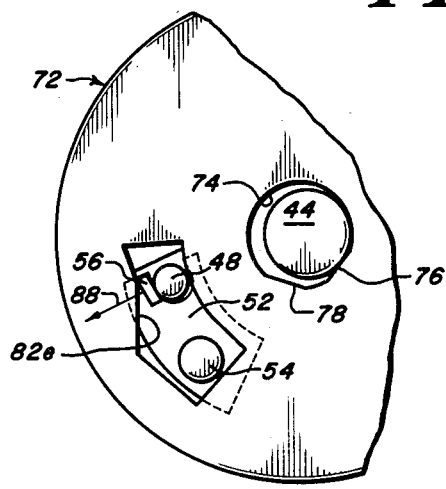
Figure 7C:
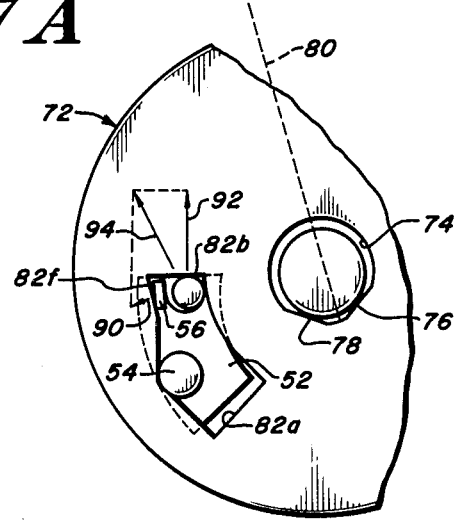

The drive chuck 18 of FIGS. 4 and 5 operates with a disk having the hub 72 of FIG. 6 as now described with additional reference to FIGS. 7A, 7B and 7C. These views show successive stages in the engagement of the drive chuck 18 with the hub 72, as viewed from above the hub with the chuck underneath.

The motor 14 (FIG. 1) is off and hence stopped when a record disk 16 is loaded into the disk memory 10. The disk hub 72 seats on the chuck 18 with the spindle 44 projecting into the hub aperture 74. FIG. 7A illustrates the typical situation where the hub 72 is off-center relative to the drive spindle at this initial condition. When the illustrated drive motor is turned on, the chuck 18 rotates clockwise as viewed in FIG. 7A. When pin 48 and tab 56 of the drive chuck advance to pass the load end 82a of the hub recess, they project without interference into the portion of the recess 82 defined by the outer surface section 82d, as appears in FIG. 7A. The disk hub is now free to lie flat on the chuck surface 18a. The magnetic attraction of the chuck permanent magnet 46 draws the hub and holds it in this seated position. The memory disk 16 typically is stationary at this time.

Continued clockwise rotation of the drive chuck moves the drive pin 48 and the bias tab 56 further clockwise relative to the memory disk, and the tab 56 engages the camming surface 82e of the hub recess. FIG. 7B shows a final stage of this condition. The sliding camming engagement of the bias tab 56 with the camming side of the hub recess rotates the cam 52 of the chuck clockwise about the mounting post 54. The tab 56 applies to the hub a force from the chuck spring 62. This force is directed radially outward on the disk hub as shown in FIG. 7B with the force vector 88. It accordingly shifts the hub 72 and correspondingly the entire disk 16 relative to the drive chuck 18. The result of this shift may, for example, be as FIG. 7B shows, where the hub flat surface 76 is seated against the drive spindle 44, but not necessarily the other flat surface 78.

Continued rotation of the drive chuck carries the tab 56 past the camming surface section 82e of the hub recess and along the reverse surface 82f until the drive pin 48 abuts the recess drive end 82b. This is the condition which FIG. 7C illustrates. At this point, the hub 72, and correspondingly the record disk 16, is positioned to the final desired location relative to the drive spindle 44. That is, the vee-saddle which the two flat surfaces 76 and 78 of the hub aperture define is seated on the drive spindle.

More particularly, FIG. 7C shows that the drive pin 48 exerts against the drive end of the hub recess a force, shown with the force vector 92, which is oriented substantially normal to the radial line 86. This force, as desired, rotates the memory disk with the drive chuck. The tab 56 continues to press radially outward on the disk hub as indicated in FIG. 7C with the force vector 90.

The resultant of the two force vectors 90 and 92, illustrated as having a force vector 94, is oriented substantially parallel to the angle bisector 80, and is directed away from the apex of the included angle which the two hub flat surfaces 76 and 78 form. This is the desired result for firmly seating both flat surfaces, and therefore the disk hub, symmetrically against the drive spindle. The disk, as a result, is precisely located with consistent accuracy relative to the spindle of the chuck.

With further reference to FIG. 7C, the preferred reverse slope of the surface section 82f, against which the tab 58 bears, directs the radial force of vector 90 rotationally backward, i.e. slightly counterclockwise from the radial orientation. As a result, the bias force from the tab 56 acts to maintain the drive pin 48 in abutting engagement with the hub end 82b. This action ensures consistent contact with minimal bounce or like disturbance between the drive pin 48 and the hub 72. This resiliently-applied consistent contact between the drive chuck and the disk hub attains precise and consistent rotational indexing of a memory disk on the disk memory and this, in turn, diminishes unusable and otherwise lost storage space in each track of a memory disk.

It should be noted that the forces which the illustrated drive chuck 18 exert on a record disk, to position the disk and to rotationally spin it, are directed essentially entirely in the plane of the disk, i.e. parallel to the plane of FIGS. 7A, 7B and 7C. There is ideally no vertical force component. This force orientation is desired to ensure that a record disk 16 seats in the disk memory with the hub flat against the chuck face. The recording surface or surfaces of the disk 16, as a result, are at the prescribed level or other location desired for optimum interaction with the read/write transducer of the disk memory.

Figure 8:
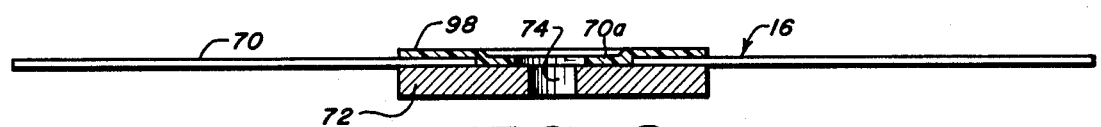
FIGS. 8 and 9 show a memory disk having a recording medium attached to a hub in accordance with features of the invention.
Figure 9:
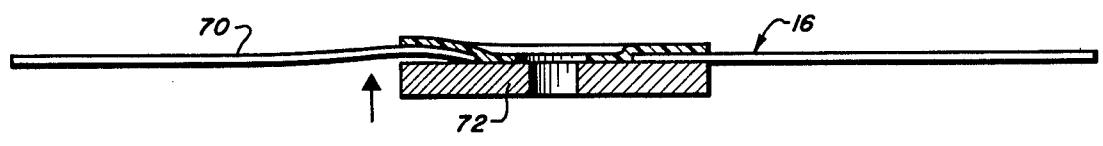

FIGS. 8 and 9 show a further feature of the invention whereby the disk record medium is relatively free to deflect from the plane of the disk hub, as desired for penetration of the disk by the recording head, particularly at inner recording tracks. Further, the record medium can deflect transversely relative to the hub without any rotational slip or windup.

More particularly, FIG. 8 shows a preferred record disk 16 with the annulus 70 of recording medium mountingly attached to the disk hub 72 by means of a selectively compliant web or tape 98 adhered to the recording annulus and to the hub. FIGS. 8 and 9 do not show the layer of adhesive at the interface of the tape 98 with the record annulus 70 and the hub 72. The inner rim 70a of the illustrated record medium rests on the hub approximately midway between the hub outer periphery and the inner periphery at the spindle aperture 74. An inner portion of the record medium adjacent this rim hence rests on the hub. The tape 98 is adhered onto this overlying inner portion of the record annulus and to the top surface of th hub within the rim 70a. The tape preferably is compliant in the thickness direction to drape over the rim 70a. However, the tape resists shear or wrinkling deformation so as to resist differential rotation of the hub 72 relative to the record medium. Similarly, the tape-securing adhesive provides a rigid nonshearing bond. A preferred material for the tape 98 is a synthetic polymer film as marketed under the trade designation "Mylar" and in one embodiment has a 5 mil thickness. A preferred adhesive is a crosslinked permanent acrylic pressure-sensitive adhesive such as is marketed by Flexcon Company, Inc. in Spencer, Mass., under the designation "V-95 Permanent Acrylic Adhesive". This adhesive also has the permanence and temperature resistance deemed desirable.

The point of attachment which the adhesive and the tape thus effect between the record medium and the hub of the disk 16 is at the inner rim 70a of the record annulus. The annulus 70 is free of attachment to the hub outward from this rim. The record annulus 70 hence is free elastically to deflect from the hub, as FIG. 9 shows, without detracting from the attachment. Accordingly, such a deflection of the recording medium of the disk 16, which a read/write head conventionally causes, can occur at record tracks aligned unusually close to the hub without undue mechanical stress and without introducing the significant geometrical misalignment that often occurs when the record medium is only free to deflect commencing at the outer edge of the hub.

The invention accordingly provides a recording disk, particularly a magnetic recording disk, of simple construction which readily receives head penetration at innermost or central tracks with unusually low mechanical stress and with unusually low geometrical distortion of recording track configuations. Further, a recording disk according to other features of the invention is readily and reliably located precisely, with comparative high accuracy, on a drive spindle that engages only one side of the disk. Further, the drive spindle can be significantly smaller than the spindle-receiving aperture in the disk, as desired for ease in loading and unloading the disk. A drive chuck according to the invention for facilitating this precise disk location with relatively simple mechanical mechanism is also provided. Although the invention is described with reference to magnetic disk memories, features of the invention and particularly of the precise locating structures thereof may have application to other rotational driving chucks, as well as to hub structures of other driven devices.

It will thus be seen that the objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A flexible magnetic recording disk apparatus comprising
   (A) a substantially rigid disk hub having a first outer periphery,
   (B) a substantially flat annulus of flexible self-supporting recording material having a central aperture therethrough with a second inner periphery less than said first periphery and contiguously overlying said hub with said inner periphery thereof substantially concentric with said hub outer periphery, and
   (C) compliant tape means overlying said annulus and adhered thereto outwardly from said second periphery and overlying said hub and adhered thereto within said second periphery,
   (D) whereby said tape means secures said annulus to said hub substantially at said second periphery and said annulus is supported by said hub to said larger first periphery and is relatively free to deflect away from said hub means between said first and second peripheries for enhancing read/write operation at track locations on said annulus proximal to said hub.

2. Recording disk apparatus according to claim 1 having the further improvement in which
   (A) said adhered tape means includes web means having substantial shear resistance and being relatively thickness compliant and secures said annulus to said hub for joint rotation substantially free of differential rotational movement.

3. Recording disk apparatus according to claim 1 having the further improvement in which said tape means includes shear resistant web means and shear resistant adhesive, whereby said hub and said recording annulus rotate together with substantially no torsional slip therebetween.

4. Flexible magnetic recording disk apparatus comprising
   (A) a substantially rigid disk hub having a first, outer periphery,
   (B) a substantially flat and flexible self-supporting recording disk element having a central aperature therethrough with a second, inner periphery less than said first periphery and disposed contiguously overlying said hub with said inner periphery thereof substantially concentric with said hub outer periphery, and
   (C) web means overlying said disk element and secured thereto outwardly from said second periphery and overlying said hub and secured thereto within said second periphery, said web means being compliant and shear-resistant for securing said recording element to said hub for rotation therewith with substantially no differential rotational slip there between and being compliant for accommodating deflection of said disk element away from said hub between said first and second peripheries for enhancing read/write operation at track locations on said disk element proximal to said hub.

5. Rotationally driven apparatus having consistently accurate circumferential and radial locations relative to a spindle of a rotational drive machine, said apparatus having hub means for drivingly coupling to the drive machine for rotation therewith in a first direction and for attaining said relative locations, and comprising the improvement wherein
   (A) said hub means has a central spindle-receiving aperture defined in part by first and second flat surfaces which define between them an included angle of less than 180° and which has a bisector selectively oriented thereon,
   (B) said hub means having a first annular face located radially of said aperture, and
   (C) means forming a locating recess on said annular face,
      (1) said recess extending circumferentially relative to said rotational direction from a first circumferential end to a second circumferential end thereof and said second circumferential end including a surface extending substantially radially relative to said aperture,
      (2) said recess having a radially inner side at a distance not greater than a first radial distance from said aperture,
      (3) said recess having a radially outer side formed with at least first, second and third sections circumferentially successive to one another from said first end to said second end, said first section being located at not less than a second radial distance greater than said first radial distance, said second section progressively radially decreasing to a third distance less than said second distance and greater than said first distance, and said third surface section extending close to said third radial distance, relative to said second radial distance, and (4) said second end of said recess being located relative to said angle bisector such that a rotational drive force applied to said second end and a radially outward force applied to said third surface section produce a resultant force oriented longitudinal to the angle bisector and directed away from the apex of said angle, (5) whereby said resultant force maintains said hub means located with both said flat surfaces thereof in abutment with a spindle received in said aperture.

6. Driven apparatus according to claim 5 having the further improvement in which said third surface section of said recess outer side progresses radially outward, from said second section to said second end, so that a radial outwardly directed force applied thereto develops a force component directed opposite to said first rotational direction.

* * * * *